US006532681B2

(12) United States Patent
Tondorf

(10) Patent No.: US 6,532,681 B2
(45) Date of Patent: Mar. 18, 2003

(54) POSITION MEASURING SYSTEM INCLUDING PARTIAL SCALE ELEMENTS

(75) Inventor: Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/131,050

(22) Filed: Aug. 7, 1998

(65) Prior Publication Data
US 2001/0037580 A1 Nov. 8, 2001

(30) Foreign Application Priority Data
Aug. 8, 1997 (DE) .......................... 197 34 363

(51) Int. Cl.$^7$ .......................... G01B 11/00; B23K 13/00
(52) U.S. Cl. .................. 33/706; 33/707; 33/DIG. 21; 219/617
(58) Field of Search .................. 33/707, 706, 702, 33/703, 704, DIG. 21; 428/426; 359/507, 436, 572; 219/121.64; 269/281.5; 29/281; 65/34

(56) References Cited

U.S. PATENT DOCUMENTS

| 4,363,964 A | * | 12/1982 | Schmitt | 33/707 |
| 4,424,435 A | * | 1/1984 | Barnes, Jr. | 65/43 |
| 4,479,716 A | * | 10/1984 | Nelle | 33/707 |
| 4,593,471 A | * | 6/1986 | Nelle | 33/706 |
| 4,663,853 A | * | 5/1987 | Indo et al. | 33/707 |
| 4,969,829 A | * | 11/1990 | Sato | 439/83 |
| 4,982,508 A | * | 1/1991 | Nelle et al. | 33/702 |
| 5,007,177 A | * | 4/1991 | Rieder et al. | 33/706 |
| 5,208,767 A | * | 5/1993 | George-Kelso et al. | 33/706 |
| 5,434,602 A | * | 7/1995 | Kaburagi et al. | 346/139 R |
| 5,461,774 A | * | 10/1995 | Holmes et al. | 29/840 |
| 5,488,782 A | | 2/1996 | Ochiai | |
| 5,489,321 A | * | 2/1996 | Tracey et al. | 65/43 |
| 5,553,390 A | * | 9/1996 | Ernst et al. | 33/706 |
| 5,760,392 A | * | 6/1998 | Hisamoto et al. | 33/706 |
| 6,119,357 A | * | 9/2000 | Ochiai et al. | 33/708 |
| 6,163,970 A | * | 12/2000 | Nelle et al. | 33/706 |
| 6,172,326 B1 | * | 1/2001 | Chang et al. | 219/121.64 |

FOREIGN PATENT DOCUMENTS

| DE | 1 548 875 | | 10/1970 |
| DE | 28 47 719 | | 5/1980 |
| DE | 229 332 A1 | * | 3/1989 |
| DE | 38 18 044 A1 | | 11/1989 |
| EP | 0 624 780 A2 | | 11/1994 |
| JP | 64-62292 | * | 3/1989 |
| JP | 8-145609 | | 6/1996 |

* cited by examiner

Primary Examiner—Christopher W. Fulton
(74) Attorney, Agent, or Firm—Brinks Hofer Gilson & Lione

(57) ABSTRACT

In connection with a position measuring system for great measuring lengths, several partial scale elements preferably formed of glass are applied on a base body. The partial scale elements are welded together.

6 Claims, 3 Drawing Sheets

POSITION MEASURING SYSTEM INCLUDING PARTIAL SCALE ELEMENTS

FIELD OF THE INVENTION

The invention relates to a scale and a method of producing a scale which has a base body on which several partial scale elements made of glass are applied, wherein each partial element has a measurement representation. The invention also relates to a position measuring system having a scale including a base body on which several partial scale elements made of glass are applied wherein each partial element has a measurement representation which can be scanned by a scanning unit having a light source and at least one photodetector for the generation of position-dependent scanning signals.

BACKGROUND OF THE INVENTION

Position measuring systems capable of measuring great lengths are required for measuring machines and machine tools. To make the manufacture of these position measuring systems easier, several short partial elements are produced and these partial elements are connected on a base body to form a scale for the entire measuring length desired.

A position measuring system and a method for producing a scale are described in German Patent Publication DE 28 47 719 A. The partial elements of the scale are rigidly connected with a base body by welding the partial elements to the base body. In addition, it is possible to arrange spot weld connections at the joints between the partial elements. The partial elements of the scale are made of metal.

A similar position measuring system is described in German Patent Publication DE 1 548 875 A. Several partial elements of a scale are welded on a base body. The partial elements of the scale are formed by a thin foil.

Further position measuring systems wherein a graduation is fastened on a base body by welding are known from European Patent Publication EP 0 624 780 A and Japanese Patent Publication JP 8-145609 A.

A position measuring system, on which the present invention is based is described in German Patent Publication DE 38 18 044 A. Several partial elements of a scale made of glass are placed against each other in the measuring direction on a base body and slidingly connected with the base body.

SUMMARY OF THE INVENTION

Advantages of the present invention will become apparent upon consideration of the following detailed description of the present preferred embodiments of the invention, together with the accompanying drawings.

It is an object of the invention to provide a cost-effective and accurate scale, as well as a position measuring system for large measuring lengths in particular.

It is a further object of the invention to provide a cost-effective method for producing a scale, in particular for large measuring lengths.

The particular advantages of the invention lie in that relatively inexpensive glass with a high-quality optical and mechanical surface quality can be used as the support of the measurement representation. A scale which is homogeneous over the entire measuring length is obtained by the connection of the partial scale elements according to the invention.

BRIEF DESCRIPTION OF THE DRAWINGS

The drawings referred to in this description should be understood as not being drawn to scale except if specifically noted.

DETAILED DESCRIPTION OF THE PRESENTLY PREFERRED EMBODIMENTS

Figure 1:
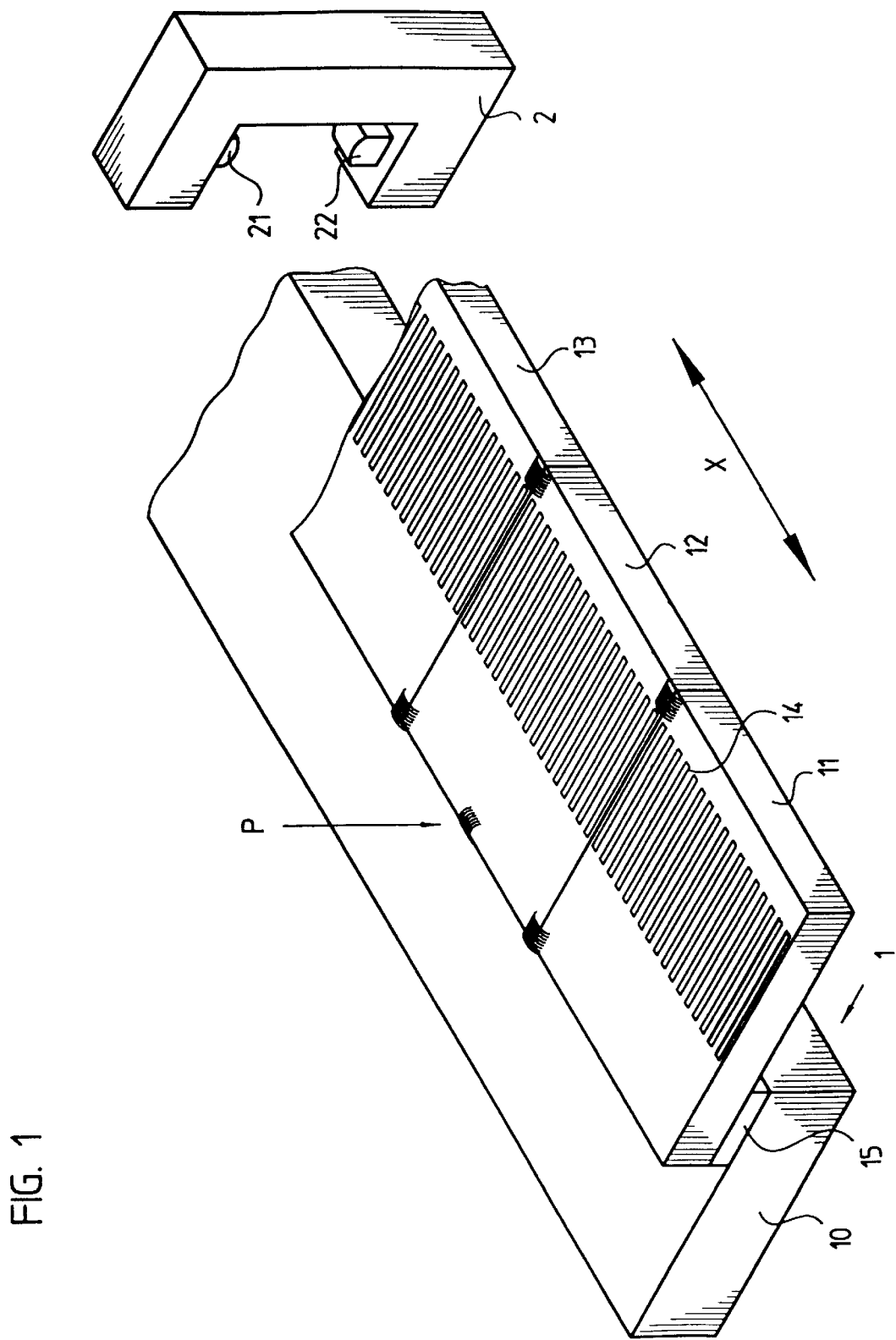
FIG. 1 represents a position measuring system with a scale consisting of several partial scale elements according to a preferred embodiment of the present invention.

FIG. 1 represents a position measuring system with a scale consisting of several partial scale elements according to a preferred embodiment of the present invention. The position measuring system includes a scale 1 and a scanning unit 2 which can be displaced relative to the scale 1 in the measuring direction X. For position measuring on a measuring machine or a machine tool, the scale 1 is fastened on a base and the scanning unit 2 is fastened on a carriage which can be displaced in relation to the base.

The scale 1 includes a base body 10, several partial scale elements 11, 12, 13 and a layer 15. The partial scale elements 11, 12 and 13 are arranged one after the other in the measuring direction X. The base body may be formed by a rail of metal, preferably steel, extending over the entire measuring length. For encapsulated position measuring systems, the base body 10 can, at the same time, constitute the housing, for example, made of aluminum.

The scanning unit 2 consists of at least one light source 21 and at least one photodetector 22. The light source 21 is arranged on one side of the partial elements 11, 12 and 13, and the photodetector 22 on the opposite side of the partial elements 11, 12 and 13.

Each partial, scale element 11, 12 and 13 carries a measurement representation preferably in the form of an incremental graduation 14. This graduation 14 has been produced according to known lithographic methods which does not form part of the invention and thus need not be described herein and can be scanned photoelectrically in accordance with the incident light method. The length of the partial elements 11, 12 and 13 is limited to the length of the copying device used in their production.

The partial elements 11, 12 and 13 are connected with the base body 10 by a layer 15 which is elastic in the measuring direction X. In a preferred embodiment, layer 15 is an adhesive layer. Different changes in length of the base body 10 and the partial elements 11, 12 and 13 are compensated by the layer 15.

In a preferred embodiment, the partial elements 11, 12 and 13 are formed of transparent glass, more preferably of ceramic glass such as Zerodur™, for example. The partial elements are coupled with one another at joints 16 preferably by welding. To this end, the partial elements 11, 12 and 13 are placed on the elastic layer 15 and the ends of the partial elements are pushed together. Thereafter, welding of the partial elements 11, 12 and 13 with each other takes place.

For creating a fixation point between the partial elements 11, 12 and 13 and the base body 10, one partial element 12 can be rigidly fastened on the base body 10 by welding at a single position P.

All known methods of welding can be employed for coupling the partial elements 11, 12 and 13 together and coupling a partial element to the base body 10 at the fixation point P. For example, the welding can be provided by resistance welding, diffusion welding and laser welding. Because partial elements 11, 12 and 13 are already provided with a graduation 14 it is necessary to take special care during the welding process that the thermal load on the graduation 14 remains small. For this reason, laser welding is particularly suitable. The laser radiation can be focused down to a minimal diameter in the range of the wavelength so that minimal work zones can be achieved. The intensity of the laser radiation can be simply controlled and using either high continuous or pulsed outputs, an intensity of $10^5$ to $10^{10}$ W/cm$^2$ can be achieved on the workpiece. These high intensities, which can be specifically controlled, have the advantage that the heat generated during welding must only be provided specifically locally and over a short time which results in a minimum heat-affected zone and, therefore, a minimum warping of the partial elements 11, 12 and 13.

If laser welding is employed, it is advantageous if the laser beam has a wavelength for which the glass of the partial elements 11, 12 and 13 is transparent, i.e., the wavelength is adapted to the material of the partial elements 11, 12 and 13 in such a way that no heat is transmitted in the glass itself. By properly selecting the wavelength, it is possible to assure the heat is exclusively transmitted at the joints between the partial elements 11, 12 and 13 which are to be welded together.

In a preferred embodiment, the ends of the partial elements 11, 12 and 13 that are to be welded to one another have a surface roughness. The surface roughness of the partial elements 11, 12 and 13 at the joints has the effect that the laser radiation is absorbed exclusively in these areas and the glass material is only locally heated and welded.

Figure 2:
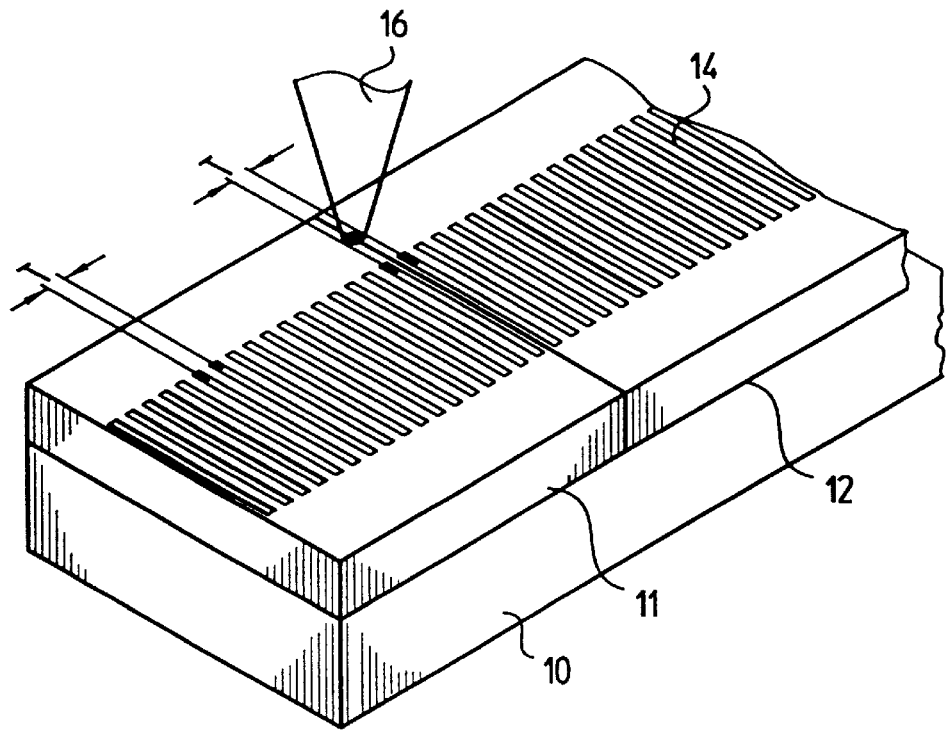
FIG. 2 illustrates a connection point between two partial scale elements according to a preferred embodiment of the present invention.

FIG. 2 illustrates a connection point between two partial scale elements according to a preferred embodiment of the present invention. The surfaces of the two ends of the partial elements 11, 12 to be welded together have been roughened by grinding to better absorb the laser radiation. The two ends are pushed together and the laser beam 16 is directed on the joint. Laser welding of the glass scales 11, 12 has the advantage that as a rule, no change in the position of the two partial elements 11, 12 occurs during the welding process. If the ends toward the graduation 14 have a defined predetermined position, adjustment of the joint is not necessary, simply pushing the two ends together is sufficient. The ends of the partial elements 11, 12 have been designed in such a way that in the pushed-together state, the two successive graduation marks 141 and 142 on partial elements 11, 12, respectively, have the specified distance T. T is the graduation period of the graduation 14 represented. This method can be particularly advantageously realized in connection with glass scales 11, 12, since the ends can be designed with great accuracy. Depending on the focusing and the angle of incidence of the laser beam 16, welding can take place over the entire joint (separating surface), or, alternatively, only involve partial areas, or respectively, the edges of the partial elements 11, 12.

Figure 3:
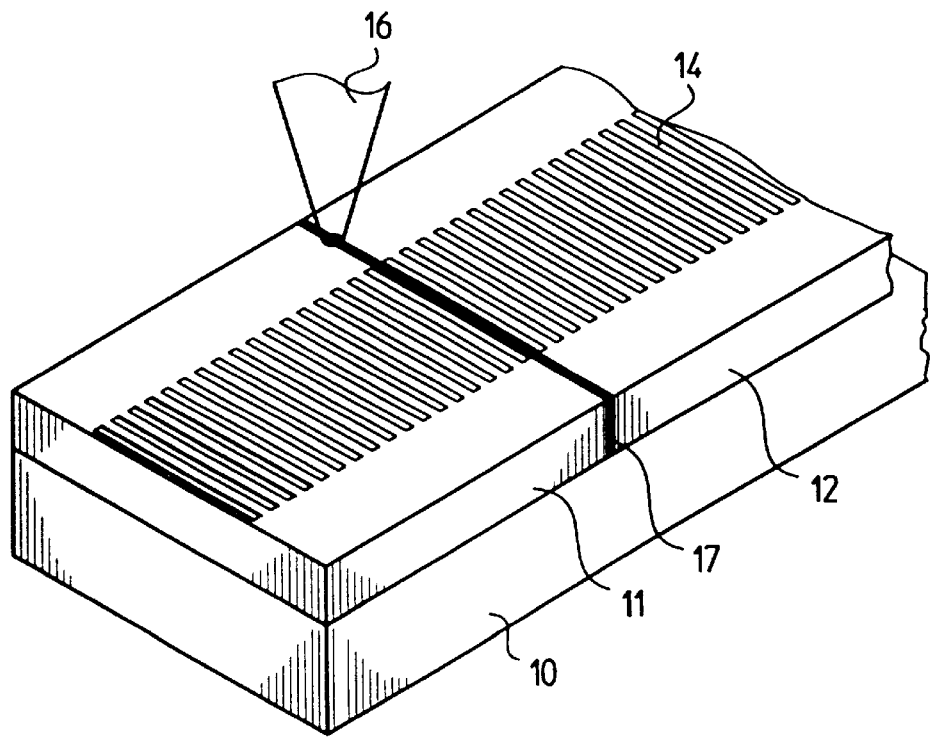
FIG. 3 illustrates a connection point between two partial scale elements according to another preferred embodiment of the present invention.

FIG. 3 illustrates a connection point between two partial scale elements according to another preferred embodiment of the present invention. A layer 17 which absorbs the laser radiation, is provided between the ends of the partial elements 11, 12. The layer 17 can have a thickness which corresponds to a gap between two graduation marks, but it can also correspond to a width of a graduation mark. The material of the layer 17 absorbs the laser radiation 16 so that the layer 17 and the adjoining glass is heated and are welded together. The layer 17 can preferably consist of silicon, chromium, nickel, platinum oxide CrNi or MoTi.

The layer 17 can be applied by vacuum evaporation or chemical deposition to one end or both ends of the partial elements 11, 12.

The layer 17 can be solid form, but also liquid or pasty form and can evaporate during the welding process of the partial elements 11, 12, or can be at least partially diffused into the glass to create a chemical interlocking of the partial elements 11, 12.

A particularly solid connection is obtained if a metal oxide (for example platinum oxide) is used as the layer 17, since metal oxides are diffused into the glass in the end areas of the partial elements 11, 12 during the welding process.

Figure 4:
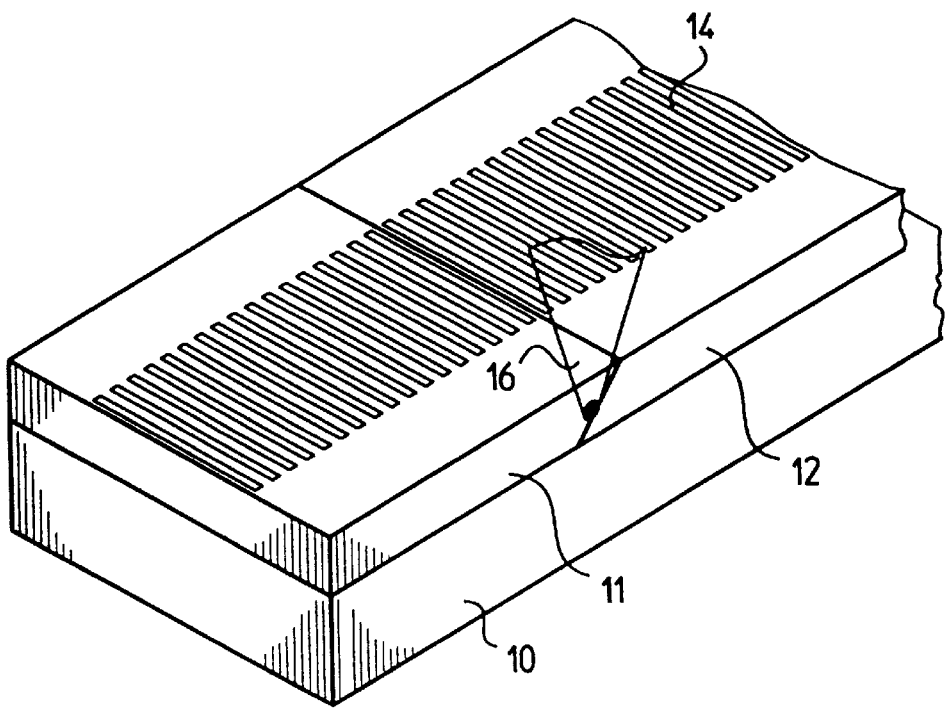
FIG. 4 illustrates a connection point between two partial scale elements according to still another preferred embodiment of the present invention in detail.

In connection with laser welding there is the possibility of being able to specifically select the depth of the weld spot. In this way the laser beam 16 can be concentrated on a level located outside the surface supporting the graduation 14. This has the advantage that during the welding process no weld spot which would interfere with scanning can occur on the surface of the graduation 14 and thus the graduation 14 is not affected. An example of this is represented in FIG. 4. The laser beam 16 is oriented vertically with respect to the surface of the graduation 14 and is focused on a plane underneath this surface. Welding takes place outside of the plane with the graduation 14. The two ends of the partial elements 11, 12 to be welded together can extend vertically (90°) with respect to the surface, or deviate from 90°, as represented in FIG. 4.

Figure 5:
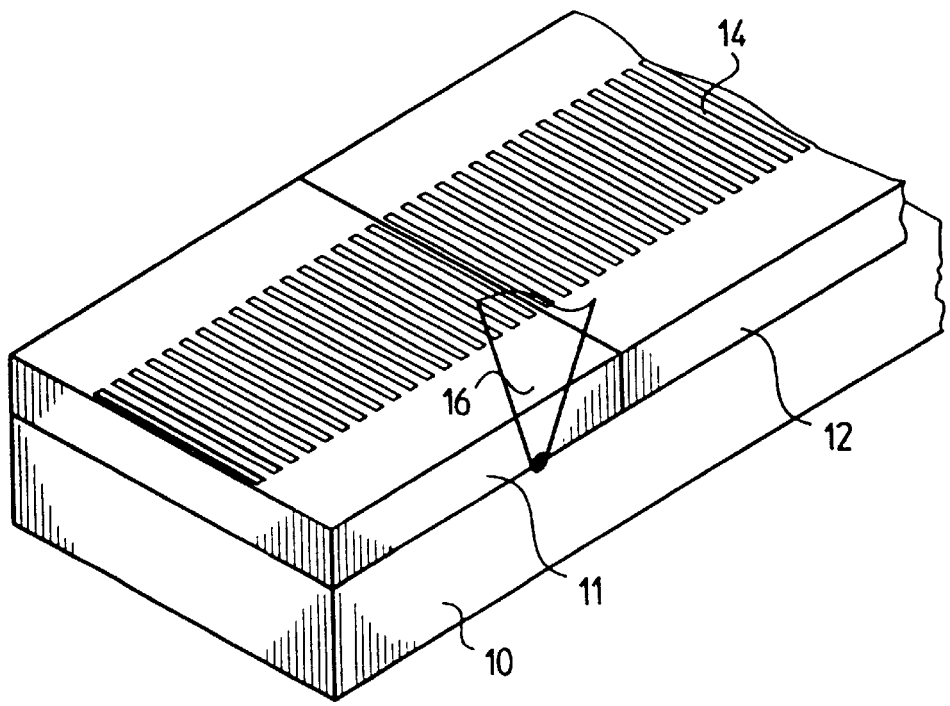
FIG. 5 illustrates two partial scale elements with a connection point between a partial element and a base body according to a preferred embodiment of the present invention.

FIG. 5 illustrates two partial scale elements with a connection point between a partial element and a base body according to a preferred embodiment of the present invention. The two partial elements 11, 12 are welded to the base body 10 by a laser beam 16. The laser beam 16 is focused on the connecting point and the wavelength is adapted to the glass material of the partial elements 11, 12, so that in the course of the passage of the laser beam 16 as little as possible energy is absorbed and energy is only released at the boundary surface between glass and metal. A chemical connection is created at this boundary surface by the diffusion of metal oxides. It is additionally possible to apply auxiliary layers to the boundary surface for an improved welding connection, for example, by vacuum evaporation of a chromium layer which enters into a bond with the glass because of its oxide character and also makes possible an alloy formation with the base body 10 because of its metallic character.

The welded connection represented in FIG. 5 can be realized by itself or in addition to the welded connections described in FIGS. 2 through 4. In this case it is particularly advantageous, as represented in FIG. 1, if the welding of the welded-together partial glass elements 11, 12, 13 with the base body 10 takes place at only one position P (reference point). The unit of the welded-together partial elements 11, 12, 13 can also be welded together with the base body 10 only at both ends 17, 19 or only at one of the both ends 17, 19 of the partial elements 11, 13, respectively, and can be resiliently seated in the remaining area in the measuring direction, for example, by an adhesive or liquid layer.

Welding can also be performed at several positions or even continuously over the entire measuring length.

A rigid connection between several or only one partial glass element 11, 12, 13 with the base body 10, provided by welding at several positions or also continuously over the entire measuring length, can also be used for forcing the expansion behavior of the base body 10 on the partial glass elements 11, 12, 13, or respectively the single partial glass element. In this case the base body 10 preferably is made of metal.

The base body 10 can be formed of metal, a ceramic material or glass. In a particularly advantageous manner the base body 10 is a body continuously extending over the entire measuring length of the scale 1. It can also be a direct component of a machine tool or measuring machine. The base body 10 can also be a guide which can be placed on a machine tool or measuring machine and is used for guiding a machine element.

The graduation 14 can be an incremental graduation or a single-track or multi-track code.

The laser used for generating the laser beam 16 can be preferably a $CO_2$ or an YAG laser.

The foregoing description of the preferred embodiments of the present invention has been presented for purposes of illustration and description. It is not intended to be exhaustive or to limit the invention to the precise form disclosed. Many modifications and variations will be apparent to practitioners skilled in the art.

Similarly, any process steps described might be interchangeable with other steps in order to achieve the same result. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

What is claimed is:

1. A scale comprising:

a base body; and several partial scale elements formed of glass applied to the base body, wherein each of the several partial scale elements comprises a measurement representation and each of the several partial elements is welded together, wherein the base body comprises a metal and a further welded connection is provided at at least one position between the several partial scale elements and the base body.

2. A scale comprising:

a base body comprising a metal; and a partial scale element formed of a glass applied to the base body, wherein the partial scale element comprises a measurement representation, wherein the partial scale element is welded to the metal of the base body.

3. A method for producing a scale comprising:

placing a partial scale element on a base body that comprises a metal; and welding the partial scale element on the metal of the base body wherein the partial scale element is made of glass.

4. A method for producing a scale comprising:

placing a partial scale element on a base body that comprises a metal; and welding the partial scale element on the metal of the base body wherein the partial scale element is made of glass, wherein the welding is performed by a laser.

5. The method according to claim 4 wherein the laser beam is oriented vertically with respect to a surface of the partial scale element and is focused on a plane underneath the surface.

6. A position measuring system comprising a scale, the system comprising:

a scanning unit comprising a light source;

a base body comprising a metal; and a partial scale element formed of glass with a measurement representation applied to the base body, which is scanned by the scanning unit; and at least one photodetector for generating position-dependent scanning signals, wherein the partial scale element is welded together with the metal of the base body.

* * * * *